T. L. GRAY.
WHEEL LOCKING DEVICE.
APPLICATION FILED AUG. 19, 1915. RENEWED MAY 31, 1916.
1,191,587. Patented July 18, 1916.
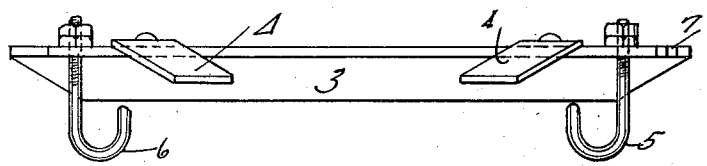
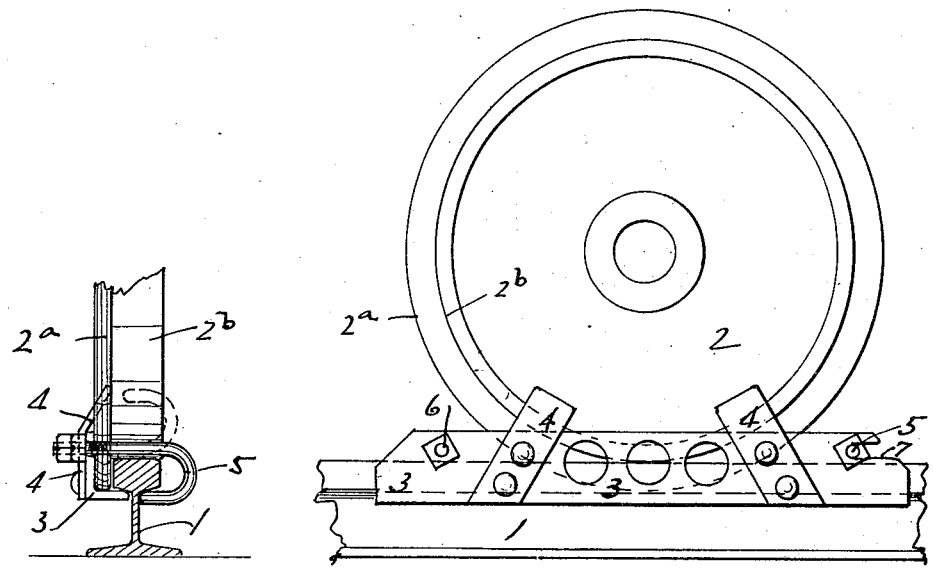

UNITED STATES PATENT OFFICE.

THOMAS L. GRAY, OF SEATTLE, WASHINGTON, ASSIGNOR TO CAR-WHEEL LOCK COMPANY, OF KING COUNTY, WASHINGTON.

WHEEL-LOCKING DEVICE.

1,191,587.   Specification of Letters Patent.   Patented July 18, 1916.

Application filed August 19, 1915, Serial No. 46,384. Renewed May 31, 1916. Serial No. 100,968.

*To all whom it may concern:*

Be it known that I, THOMAS L. GRAY, a citizen of the United States, and a resident of Seattle, in the county of King and State of Washington, have invented certain new and useful Improvements in Wheel-Locking Devices, of which the following is a full, true, and exact specification.

My invention relates to wheel locking devices and has for its principal object to generally improve and simplify the construction of my previous application Serial No. 865,304, filed October 6th, 1914, in that only one angle is used with hook bolts passing therethrough for clamping the rail and wheel together. I have found by continuous actual use that my former device was unnecessarily heavy and cumbersome, that the time required to place it was excessive and further; that one angle and the hook bolts, as will presently be described, give equally as good results without the objections noted.

Other objects will appear as my invention is more fully explained in the following specification, illustrated in the accompanying drawings and pointed out in the appended claims.

Figure 1 is a plan view of my device. Fig. 2 is a side elevation of same shown applied to a wheel and rail. Fig. 3 is an end elevation of same.

Referring more particularly to the drawings, numeral 1 indicates a fragment of a rail, 2 a wheel having a flange $2^a$ and tread $2^b$. An angle bar 3 is provided with bent over lugs 4 which are adapted to project inside the rim of a wheel as shown. Hook bolts 5 and 6 pass through a slot 7 and a hole respectively in either end of the upstanding leg of angle 3.

In using my device, the angle 3 is placed as shown by Figs. 2 and 3 with the horizontal leg beneath the flange of the wheel and the ball of the rail and the vertical side against the outside of the flange. The hook bolts 5 and 6 are hooked over the ball of the rail and tightened up to clamp the rail and wheel together and to maintain the lugs 4 within the wheel. The slot 7 allows of more quickly placing and releasing the device. The device may be also used by hooking the hook bolts around the edge of the wheel tread $2^b$ as shown by dotted lines in Fig. 3, which is an effective means of preventing the wheels from lifting from the rail but does not prevent sliding of the wheel. It is apparent that my present device can be placed and released quicker than my former device and it has proved as efficient in holding the rail and wheel together.

While I have shown a particular form of embodiment of my invention, I am aware that many minor changes therein, will readily suggest themselves to others skilled in the art without departing from the spirit and scope of the invention, and I therefore desire to avoid being limited to the exact form shown and described except as pointed out in the appended claims.

Having described my invention, what I claim as new and desire to protect by Letters Patent, is—

1. In a device for clamping the wheels of a car to the rail, the combination of a single angle bar, lugs upon the vertical leg of said angle bar, the upper end of each of said lugs being bent inwardly to project inside the outer lines of the said wheel, hook bolts passing through the upstanding leg of said angle bar and adapted to hook over the ball of said rail, whereby movement of the wheel with respect to the rail is prevented when the angle bar is adjusted and the hook bolts tightened.

2. In a device for clamping the wheels of a car to the rails, including a single angle bar having lugs upon the vertical leg, the upper ends of said lugs being bent inwardly to project inside the outer line of the said wheels, the combination of hook bolts passing through and coöperating with the upstanding leg of said angle bar and hooking over and engaging the ball of said rail, whereby the wheel is clamped and movement with respect to the rail is prevented when the angle bar is adjusted and the hook bolts tightened.

THOMAS L. GRAY.

Copies of this patent may be obtained for five cents each, by addressing the "Commissioner of Patents, Washington, D. C."